United States Patent
Ashraf et al.

(10) Patent No.: US 12,348,999 B2
(45) Date of Patent: Jul. 1, 2025

(54) SIDELINK MEASUREMENTS REPORT

(71) Applicant: Telefonaktiebolaget LM Ericsson (publ), Stockholm (SE)

(72) Inventors: Shehzad Ali Ashraf, Aachen (DE); Congchi Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 364 days.

(21) Appl. No.: 17/802,116

(22) PCT Filed: Feb. 23, 2021

(86) PCT No.: PCT/IB2021/051527
§ 371 (c)(1),
(2) Date: Aug. 24, 2022

(87) PCT Pub. No.: WO2021/171184
PCT Pub. Date: Sep. 2, 2021

(65) Prior Publication Data
US 2023/0079437 A1    Mar. 16, 2023

Related U.S. Application Data

(60) Provisional application No. 62/980,876, filed on Feb. 24, 2020.

(51) Int. Cl.
*H04W 24/10* (2009.01)
*H04B 17/318* (2015.01)

(52) U.S. Cl.
CPC .......... *H04W 24/10* (2013.01); *H04B 17/318* (2015.01)

(58) Field of Classification Search
CPC .............................. H04W 24/10; H04B 17/318
See application file for complete search history.

(56) References Cited

U.S. PATENT DOCUMENTS

2018/0317278 A1* 11/2018 Fujishiro ............... H04W 8/005
2019/0079659 A1*  3/2019 Adenwala ............... H04W 4/46
(Continued)

FOREIGN PATENT DOCUMENTS

| EP | 3925261 B1 * | 8/2024 | ............ H04W 24/08 |
| WO | WO-2018106467 A1 * | 6/2018 | |
| WO | WO-2018228127 A1 * | 12/2018 | ............ H04W 24/10 |

OTHER PUBLICATIONS

Google English Translation of WO 2018228127 A1 Dec. 20, 2018.*
(Continued)

*Primary Examiner* — Kenny S Lin
(74) *Attorney, Agent, or Firm* — Sage Patent Group

(57) ABSTRACT

Systems and methods are disclosed herein for sidelink measurement reporting. In one embodiment, a method performed by a wireless device for reporting sidelink measurements comprises obtaining a configuration of a plurality of threshold conditions for triggering an aperiodic sidelink measurement report and detecting one of the plurality of threshold conditions for triggering an aperiodic sidelink measurement report. The method further comprises, in response to detecting the one of the plurality of threshold conditions for triggering an aperiodic sidelink measurement report, sending an aperiodic sidelink measurement report. In this manner, more accurate path loss or channel busy ratio (CBR) estimation in sidelink communication is enabled, thereby improve sidelink power control performance, resource allocation performance, and hence the overall sidelink communication performance.

19 Claims, 10 Drawing Sheets

(56) References Cited

U.S. PATENT DOCUMENTS

| | | | | |
|---|---|---|---|---|
| 2020/0145867 | A1* | 5/2020 | Tseng | H04L 1/0026 |
| 2020/0322024 | A1* | 10/2020 | Cheng | H04W 76/11 |
| 2021/0099251 | A1* | 4/2021 | Podlozhnyuk | H03M 13/1111 |
| 2022/0159497 | A1* | 5/2022 | Lee | H04L 1/1812 |
| 2022/0286255 | A1* | 9/2022 | Guo | H04L 5/006 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.12.0, Dec. 2020.

3GPP, "3rd Generation Partnership Project; Technical Specification Group Radio Access Network; Evolved Universal Terrestrial Radio Access (E-UTRA); Radio Resource Control (RRC); Protocol specification (Release 15)", TS 36.331 V15.8.0, Dec. 2019.

3GPP, "3rd Generation Partnership Project; Technical Specification Group Radio Access Network; NR; Radio Resource Control (RRC) protocol specification (Release 15)", TS 38.331 V15.7.0, Sep. 2019.

Media Tek, "Sidelink RSRP reporting", 3GPP TSG-RAN WG2 Meeting #108, R2-1916004, Nov. 18-22, 2019, Reno, US.

Oppo, "SL RSRP measurement report via PC5-RRC", 3GPP TSG-RAN WG2 Meeting #108, R2-1914465, Nov. 18-22, 2019, Reno, USA.

ZTE Corporation, et al., "Discussion on NR V2X CBR", 3GPP TSG-RAN WG2 Meeting #108, R2-1914538, Nov. 18-22, 2019, Reno, Nevada, USA.

* cited by examiner

SIDELINK MEASUREMENTS REPORT

RELATED APPLICATIONS

This application is a national phase application of International Patent Application No. PCT/IB2020/055093, filed May 28, 2020, which claims the benefit of U.S. Provisional Patent App. No. 62/980,876, filed Feb. 24, 2020, the disclosures of which are hereby incorporated herein by reference in their entirety.

TECHNICAL FIELD

The present disclosure relates to measurement reporting in a wireless network and, more specifically, to measurement reporting for a sidelink in a cellular communications network.

BACKGROUND

During Release 14 and Release 15, the Long Term Evolution (LTE) standard has been extended with support of Device-to-Device (D2D) (specified as "sidelink") features targeting vehicular communications, collectively referred to as Vehicle-to-Anything (V2X). FIG. 1 illustrates some V2X applications within a conventional network, shown as a dashed oval in FIG. 1. Besides Vehicle-to-Vehicle (V2V) communication, V2X includes Vehicle-to-Pedestrian (V2P), Vehicle-to-Network (V2N), and Vehicle-to-Infrastructure (V2I). V2V, V2P, and V2I are examples of Sidelink (SL) communication but V2N is not, since V2N involves the base station. These direct communication functionalities are built upon LTE D2D, also known as ProSe (Proximity Services), as first specified in the Release 12 of LTE, and include many important enhancements targeting the specific characteristics of vehicular communications. For example, LTE V2X operation is possible with and without network coverage and with varying degrees of interaction between the User Equipments (UEs) and the Network (NW), including support for standalone, network-less operation.

Release 14 V2X aims at providing basic safety-related use cases such as forward collision warning, emergency braking, roadworks warning, etc. This was achieved by technical solutions making LTE a suitable technology for meeting the requirements of the European Telecommunications Standards Institute (ETSI) for delivering traffic safety messages such as Cooperative Awareness Messages (CAM) and Decentralized Environmental Notification Messages (DENM). LTE Release 15 enhanced the Release 14 V2X features to support more advanced use cases, categorized into four use case groups: vehicles platooning, extended sensors, advanced driving, and remote driving. However, the Release 15 enhancements were limited by backward compatibility with Release 14 V2X, and therefore were not be able to fulfil all the requirements of the advanced V2X services.

The on-going Fifth Generation (5G) V2X standardization efforts in Release 16 aim at enhancing Third Generation Partnership Project (3GPP) New Radio (NR) system to meet the stringent Quality of Service (QoS) requirements (e.g., in terms of latency and reliability) of the aforementioned advanced V2X services that are beyond the capabilities of LTE V2X Release 14 and Release 15. This requires a new NR sidelink design for V2X. A key technical feature of NR sidelink for V2X is the capability to support physical-layer unicast and groupcast (or multicast) when compared to broadcast-only LTE sidelink One of the physical layer procedures of interest for the different cast modes is transmit power control.

In regard to power control for NR uplink (UL), as with LTE, in NR the transmit power in the uplink (from the UE to the network) is often controlled by the NR Base Station (gNB). This serves two main purposes:

To ensure that the received power (at the network) of the uplink signal is at a satisfactory level to allow for successful decoding of the signal;

At the same time, the transmit power should not be unnecessarily high as that would cause unnecessarily high interference to other uplink signals.

LTE and NR uplink power control are based on a combination of:

Open-Loop Power Control: The UE estimates the uplink path loss based on measuring signals in the downlink and sets the transmit power accordingly.

Closed-Loop Power Control: The network measures received uplink powers. Based on these past measurements the network controls the transmit power of the UE by sending power-control commands to the UE.

In a simplified term, the baseline power control algorithm in the UL can be expressed as the following Equation (1):

$$P=\min\{P_{max}, P'_{max}(PL_{UL}, P_0)\} \qquad (1)$$

where P denotes the transmit power at the UE and $P_{max}$ denotes the maximum allowed transmit power per carrier. $P'_{max}(PL_{UL}, P_0)$ is a collective term taking into account the impacts of uplink path loss $PL_{UL}$, the desired received power $P_0$ (configurable by the network), and several other factors such as the Modulation and Coding Scheme (MCS) and a power-control command in the case of closed-loop power control.

In LTE, the UE measurements of the Reference Signal Received Power (RSRP) for calculating UL path loss are made on the Cell-specific Reference Signal (CRS). NR uses the Secondary Synchronization Signal (SSS) for Secondary Synchronization RSRP (SS-RSRP) measurement or Channel State Information Reference Signal (CSI-RS) for Channel State Information RSRP (CSI-RSRP) measurement. For Frequency Range 1 (FR1), the reference point for the SS-RSRP or CSI-RSRP shall be the antenna connector of the UE. For frequency range 2 (FR2), SS-RSRP or CSI-RSRP shall be measured based on the combined signal from antenna elements corresponding to a given receiver branch. For frequency range 1 and 2, if receiver diversity is in use by the UE, the reported SS-RSRP or CSI-RSRP value shall not be lower than the corresponding SS-RSRP or CSI-RSRP of any of the individual receiver branches.

In NR Uu (for DL power control), RSRP is measured on Downlink (DL) CSI-RS or Synchronization Signal Block (SSB) by the UE, and a report is then sent to gNB. Based on the report, gNB can adjust the DL power. RSRP reporting can be configured in a periodic manner or aperiodic (i.e., event triggered) manner.

The aperiodic RSRP reporting is triggered by higher layers when a UE enters into pre-defined event(s) which are as described in the following excerpt from 3GPP Technical Specification (TS) 38.331, Version 15.7.0:

Begin Excerpt of TS 38.311

Event A1 (Serving becomes better than threshold)
The UE shall:
1 > consider the entering condition for this event to be satisfied when condition A1-1, as specified below, is fulfilled;
1 > consider the leaving condition for this event to be satisfied when condition A1-2, as specified below, is fulfilled;
1 > for this measurement, consider the NR serving cell corresponding to the associated measObjectNR associated with this event.
Inequality A1-1 (Entering condition)
Ms − Hys > Thresh
Inequality A1-2 (Leaving condition)
Ms + Hys < Thresh
The variables in the formula are defined as follows:
Ms is the measurement result of the serving cell, not taking into account any offsets.
Hys is the hysteresis parameter for this event (i.e. hysteresis as defined within reportConfigNR for this event).
Thresh is the threshold parameter for this event (i.e. a1-Threshold as defined within reportConfigNR for this event).
Ms is expressed in dBm in case of RSRP, or in dB in case of RSRQ and RS-SINR.
Hys is expressed in dB.
Thresh is expressed in the same unit as Ms.5.5.4.3
Event A2 (Serving becomes worse than threshold)
The UE shall:
1 > consider the entering condition for this event to be satisfied when condition A2-1, as specified below, is fulfilled;
1 > consider the leaving condition for this event to be satisfied when condition A2-2, as specified below, is fulfilled;
1 > for this measurement, consider the serving cell indicated by the measObjectNR associated to this event.
Inequality A2-1 (Entering condition)
Ms + Hys < Thresh
Inequality A2-2 (Leaving condition)
Ms − Hys > Thresh
The variables in the formula are defined as follows:
Ms is the measurement result of the serving cell, not taking into account any offsets.
Hys is the hysteresis parameter for this event (i.e. hysteresis as defined within reportConfigNR for this event).
Thresh is the threshold parameter for this event (i.e. a2-Threshold as defined within reportConfigNR for this event).
Ms is expressed in dBm in case of RSRP, or in dB in case of RSRQ and RS-SINR.
Hys is expressed in dB.
Thresh is expressed in the same unit as Ms.

End Excerpt of TS 38.311

In regard to power control for NR sidelink V2X, as mentioned above, transmit power control is important for NR sidelink V2X. It serves the following purposes:

It helps to manage the UE power consumption, which may be important for certain UE types (e.g., pedestrian UE). This aspect is crucial for resource constrained devices with limited battery power and less important for vehicle UEs.

It helps to adjust the transmission range to the intended receiver and ensure good reception at the receiver, at the same time limiting the interference caused towards non-intended receivers. This is especially important for D2D or sidelink operation in the licensed spectrum when sidelink and cellular resources overlap.

To achieve the above two goals and given what is done for the UL power control, it is natural to base the sidelink (SL) power control procedure on the path loss estimated between the Transmit (TX) UE and gNB (if TX UE is in coverage) and also on the path loss between TX UE and Receive (RX) UE. Hence, the SL transmit power can be represented by the following generic formula $$P = \min \{P_{max}, P_{req}(PL_{SL}), P'_{max}(PL_{UL})\} \quad (2)$$

where $P_{max}$ is the maximum allowed transmit power configured by the higher layers in the protocol stack, $P_{req}$ ($PL_{SL}$) is the required transmit power calculated based on the sidelink path loss $PL_{SL}$ between TX UE and RX UE in order to guarantee reliable reception, and $P'_{max}$ ($PL_{UL}$) is the maximum allowed transmit power when considering the interference to UL reception, where $PL_{UL}$ is the path loss between TX UE and the gNB based on downlink measurements. This term is present when the UE is inside network coverage and is introduced to limit the interference to UL reception at the gNB since typically SL transmissions occur in UL radio resources.

The formula in Equation (2) reflects the current agreements in 3GPP RAN1 on open-loop transmit power control when both downlink path loss and SL path loss are considered. RAN1 has also agreed not to support closed-loop power control in Release 16 NR SL. Compared to the UL power control in Equation (1), the SL power control in Equation (2) decouples the required (or desired) transmit power from $P'_{max}$ because the desired receiver is another UE. Also note that in LTE sidelink, due to broadcast transmissions, only $P_{max}$ and $P'_{max}$ ($PL_{UL}$) are used for sidelink power control since the set of target RX UEs is too large for each individual sidelink $P_{req}$ to be relevant. However, for NR sidelink unicast and groupcast, it is feasible to determine $P_{req}$, enabling the TX UE to adjust its transmit power accordingly.

FIG. 2 illustrates the basic principle of sidelink transmit power control for a single unicast TX-RX link, as agreed by 3GPP.

The transmitter UE (UE1) sends a Reference Signal (RS) to the receiver UE (UE2).

UE2 measures a sidelink (S)-$RSRP_{21}$ on the RS and reports (S)-$RSRP_{21}$ back to the UE1.

UE1 estimates the sidelink path loss between UE1 and UE2 based on UE2's the report and uses the estimate for its power control in Equation (2).

In regarding to RSRP reporting on the sideline, similar to NR Uu, it is agreed in 3GPP that both periodic and aperiodic (i.e., event triggered) RSRP reporting (i.e., Sidelink RSRP (S-RSRP) report) are supported. Based on this, a UE can be configured to do either periodic or aperiodic S-RSRP reporting.

In LTE V2X, when UE is in Radio Resource Control (RRC) CONNECTED state operating SL transmission, the UE will report Channel Busy Ratio (CBR) measurement to evolved or enhanced Node B (eNB). CBR measurement can be reported in either periodic or event-triggered manner. In case of event-triggered CBR measurement report, UE will report CBR measurement to eNB if the measured CBR is above an upper bound threshold or below a lower bound threshold as explained in the excerpt below from TS 36.331.

SUMMARY

Systems and methods are disclosed herein for sidelink measurement reporting. In one embodiment, a method performed by a wireless device for reporting sidelink measurements comprises obtaining a configuration of a plurality of threshold conditions for triggering an aperiodic sidelink measurement report and detecting one of the plurality of threshold conditions for triggering an aperiodic sidelink measurement report. The method further comprises, in response to detecting the one of the plurality of threshold conditions for triggering an aperiodic sidelink measurement report, sending an aperiodic sidelink measurement report. In this manner, more accurate path loss or channel busy ratio (CBR) estimation in sidelink communication is enabled, thereby improve sidelink power control performance, resource allocation performance, and hence the overall sidelink communication performance.

In one embodiment, the method further comprises detecting another of the plurality of threshold conditions for triggering an aperiodic sidelink measurement report and, in response to detecting the another of the plurality of threshold

---

Begin Excerpt of TS 36.331

---

5.5.4.14 Event V1 (The channel busy ratio is above a threshold)
The UE shall:
   1 > consider the entering condition for this event to be satisfied when condition V1-1, as specified below, is fulfilled;
   1 > consider the leaving condition for this event to be satisfied when condition V1-2, as specified below, is fulfilled;
Inequality V1-1 (Entering condition)
Ms − Hys > Thresh
Inequality V1-2 (Leaving condition)
Ms + Hys < Thresh
The variables in the formula are defined as follows:
   Ms is the measurement result of channel busy ratio of the transmission resource pool, not taking into account any offsets.
   Hys is the hysteresis parameter for this event (i.e. hysteresis as defined within reportConfigEUTRA for this event).
   Thresh is the threshold parameter for this event (i.e. v1-Threshold as defined within ReportConfigEUTRA).
   Ms is expressed in decimal from 0 to 1 in steps of 0.01.
   Hys is expressed is in the same unit as Ms.
   Thresh is expressed in the same unit as Ms.
5.5.4.15 Event V2 (The channel busy ratio is below a threshold)
The UE shall:
   1 > consider the entering condition for this event to be satisfied when condition V2-1, as specified below, is fulfilled;
   1 > consider the leaving condition for this event to be satisfied when condition V2-2, as specified below, is fulfilled;
Inequality V2-1 (Entering condition)
Ms + Hys < Thresh
Inequality V2-2 (Leaving condition)
Ms − Hys > Thresh
The variables in the formula are defined as follows:
   Ms is the measurement result of channel busy ratio of the transmission resource pool, not taking into account any offsets.
   Hys is the hysteresis parameter for this event (i.e. hysteresis as defined within reportConfigEUTRA for this event).
   Thresh is the threshold parameter for this event (i.e. v2-Threshold as defined within ReportConfigEUTRA).
Ms is expressed in decimal from 0 to 1 in steps of 0.01.
Hys is expressed is in the same unit as Ms.
Thresh is expressed in the same unit as Ms
End Excerpt of TS 36.331

---

There currently exist certain challenge(s). As mentioned above, the power control in LTE SL does not include the impact of sidelink path loss since LTE SL targets only broadcast transmissions. Hence, it is not possible to use any LTE S-RSRP handling mechanism for NR SL.

conditions for triggering an aperiodic sidelink measurement report, sending another aperiodic sidelink measurement report.

In one embodiment, the plurality of threshold conditions for triggering an aperiodic sidelink measurement report comprises at least two threshold conditions.

In one embodiment, the plurality of threshold conditions are for triggering an aperiodic Sidelink Reference Signal Receive Power (S-RSRP) report for a sidelink between the wireless device and another wireless device. In one embodiment, the plurality of threshold conditions for triggering an aperiodic S-RSRP report comprises a number (N) of threshold conditions, and the number (N) of threshold conditions is dependent on channel congestion. In one embodiment, the plurality of threshold conditions for triggering an aperiodic S-RSRP report comprises a number (N) of threshold conditions, and the number (N) of threshold conditions is dependent on a measured channel congestion for the sidelink. In one embodiment, the plurality of threshold conditions for triggering an aperiodic S-RSRP report comprises a number (N) of threshold conditions, and the number (N) of threshold conditions is dependent on a measured CBR for the sidelink. In one embodiment, the plurality of threshold conditions for triggering an aperiodic S-RSRP report comprises a list of S-RSRP threshold for each of a plurality of CBR levels. In one embodiment, the plurality of threshold conditions for triggering an aperiodic S-RSRP report comprises a plurality of S-RSRP thresholds. In one embodiment, the plurality of threshold conditions for triggering an aperiodic S-RSRP report comprises a number (N) of threshold conditions, and the number (N) of threshold conditions is dependent on a change of transmit power of a reference signal on which the wireless device measures S-RSRP for the sidelink.

In one embodiment, the plurality of threshold conditions for triggering an aperiodic S-RSRP report comprises threshold conditions defined in terms of events which cause the wireless device to trigger S-RSRP reporting.

In one embodiment, the plurality of threshold conditions for triggering an aperiodic S-RSRP report comprises threshold conditions defined to trigger S-RSRP reporting based on differences between S-RSRP measurements performed by the wireless device at different time instances.

In one embodiment, the one of the plurality of threshold conditions for triggering an aperiodic sidelink measurement report is a threshold condition to trigger S-RSRP reporting when a difference between two consecutive S-RSRP measurements performed on the wireless device for the sidelink is higher than a threshold.

In one embodiment, the plurality of threshold conditions for triggering an aperiodic S-RSRP report comprises threshold conditions defined to trigger S-RSRP reporting based on difference between a filtered S-RSRP measurement on the sidelink and an instantaneous S-RSRP measurement on the sidelink In one embodiment, the plurality of threshold conditions for triggering an aperiodic S-RSRP report comprises an event defined to trigger S-RSRP reporting based on a change of one or more transmit parameters used by the other wireless device for the sidelink.

In one embodiment, the plurality of threshold conditions are for triggering an aperiodic CBR measurement report for a sidelink between the wireless device and another wireless device. In one embodiment, the plurality of threshold conditions comprises a plurality of CBR thresholds for triggering an aperiodic CBR measurement report. In one embodiment, the plurality of threshold conditions comprises threshold conditions defined to trigger an aperiodic CBR measurement report when a difference between CBR measurements at different time instances is greater than a threshold.

In one embodiment, at least one of the plurality of threshold conditions for triggering an aperiodic sidelink measurement report comprises a hysteresis factor.

In one embodiment, detecting the one of the plurality of threshold conditions for triggering an aperiodic sidelink measurement report comprises detecting that a monitored characteristic has reached a respective threshold value.

In one embodiment, detecting the one of the plurality of threshold conditions for triggering an aperiodic sidelink measurement report comprises detecting that a monitored characteristic has changed by a respective threshold amount.

In one embodiment, the aperiodic sidelink measurement report comprises a S-RSRP measurement.

In one embodiment, a number N of threshold conditions in the plurality of threshold conditions is dynamically adjusted based on channel conditions.

In one embodiment, a number N of threshold conditions in the plurality of threshold conditions is dynamically adjusted based on channel congestion measured as CBR. In one embodiment, the number N of threshold conditions is reduced if CBR is above a first congestion threshold or increased if CBR is below the first congestion threshold or a second congestion threshold.

Corresponding embodiments of a wireless device are also disclosed. In one embodiment, a wireless device for reporting sidelink measurements is adapted to obtain a configuration of a plurality of threshold conditions for triggering an aperiodic sidelink measurement report and detect one of the plurality of threshold conditions for triggering an aperiodic sidelink measurement report. The wireless device is further adapted to, in response to detecting the one of the plurality of threshold conditions for triggering an aperiodic sidelink measurement report, send an aperiodic sidelink measurement report.

In one embodiment, a wireless device for reporting sidelink measurements comprises one or more transmitters, one or more receivers, and processing circuitry associated with the one or more transmitters and the one or more receivers. The processing circuitry is configured to cause the wireless device to obtain a configuration of a plurality of threshold conditions for triggering an aperiodic sidelink measurement report and detect one of the plurality of threshold conditions for triggering an aperiodic sidelink measurement report. The processing circuitry is further configured to cause the wireless device to, in response to detecting the one of the plurality of threshold conditions for triggering an aperiodic sidelink measurement report, send an aperiodic sidelink measurement report. In one embodiment, the processing circuitry is included in a vehicle control system.

In one embodiment, a vehicle comprises one or more transmitters, one or more receivers, and processing circuitry associated with the one or more transmitters and the one or more receivers. The processing circuitry is configured to cause the vehicle to perform operations comprising obtaining a configuration of a plurality of threshold conditions for triggering an aperiodic sidelink measurement report, detecting one of the plurality of threshold conditions for triggering an aperiodic sidelink measurement report, and, in response to detecting the one of the plurality of threshold conditions for triggering an aperiodic sidelink measurement report, sending an aperiodic sidelink measurement report.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
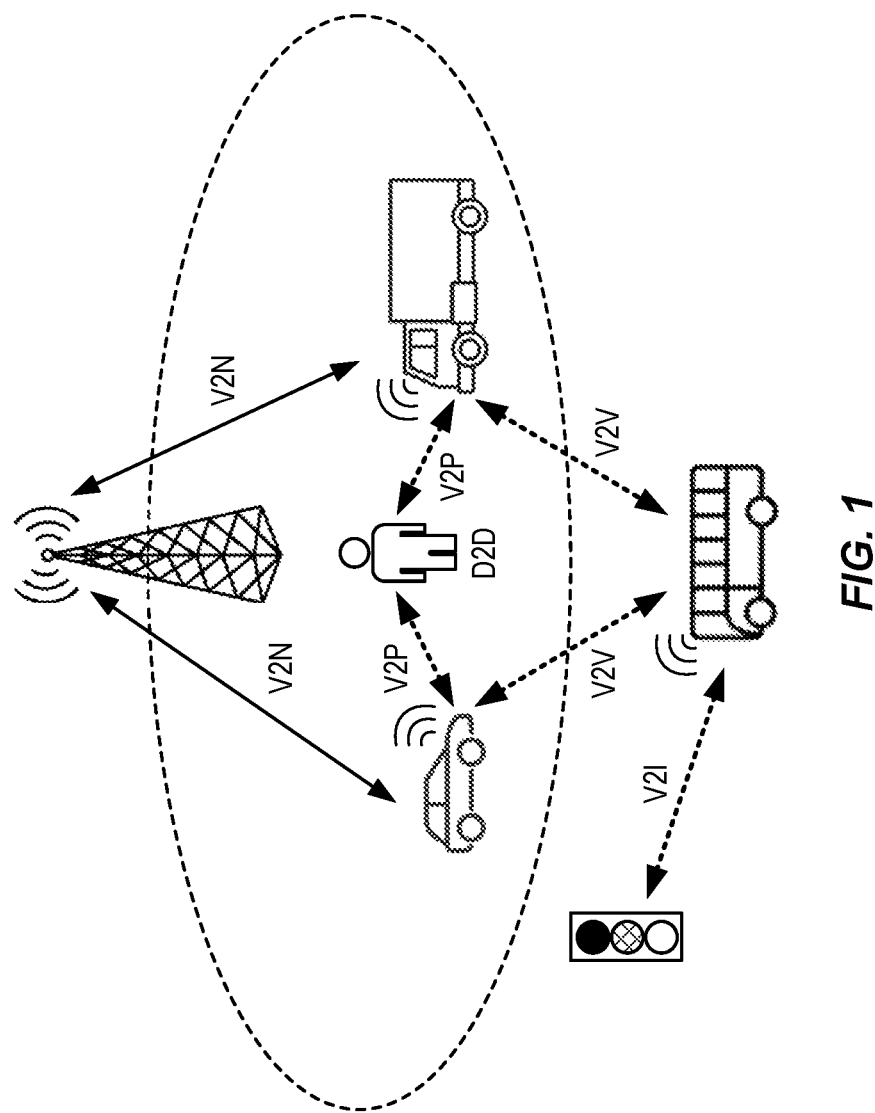
FIG. 1 illustrates some Vehicle-to-Anything (V2X) applications within a conventional network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenges. As mentioned above, the power control in LTE sidelink (SL) does not include the impact of sidelink path loss since LTE SL targets only broadcast transmissions. Hence, it is not possible to use any LTE SL Reference Signal Receive Power (S-RSRP) handling mechanism for NR SL.

Figure 3:
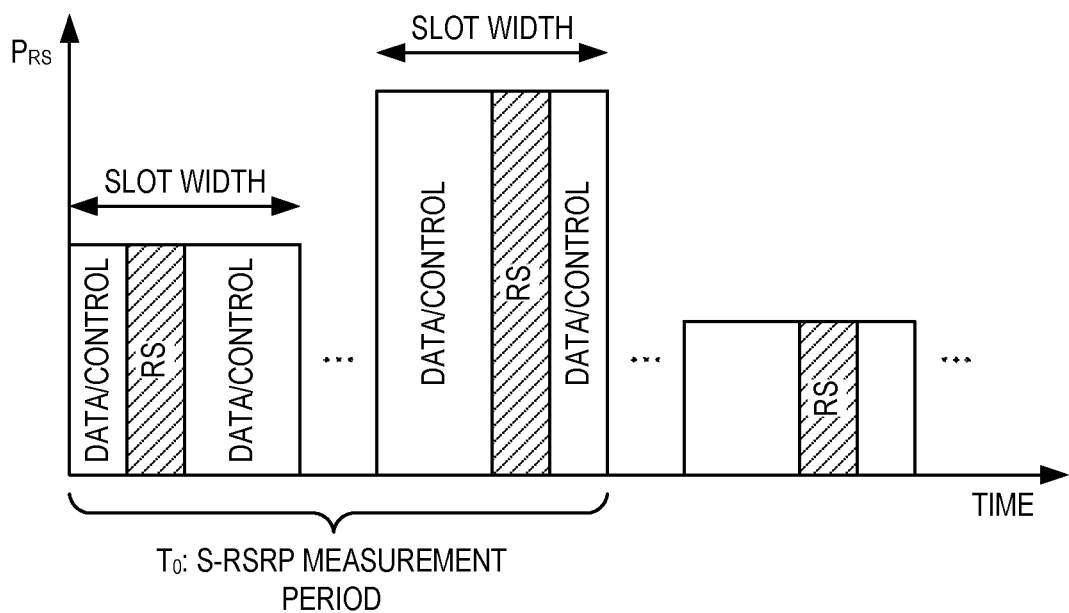
FIG. 3 illustrates a problem that may occur if Long Term Evolution (LTE)/New Radio (NR) uplink (UL) power control is applied to sidelink.

FIG. 3 illustrates a problem that may occur if LTE/NR uplink (UL) power control is applied to SL. Typically, the S-RSRP reported back is averaged over multiple samples over a measurement period $T_0$. However, unlike in the UL power control where the RS transmit power in the downlink is semi-statically configured by the gNB and is kept constant over the measurement period, the SL reference signal (RS) transmit power can vary during $T_0$. Typically, the receiver (RX) UE is unaware of the transmit power variation of the RS and therefore cannot compensate for the change in RS transmit power while calculating the S-RSRP.

As a result, if configured with only one threshold for triggering of RSRP reports in case of aperiodic reporting, RSRP reporting will not be a true measure of SL path loss. For instance, S-RSRP report will be only triggered if RSRP is below or above a certain threshold. However, it may happen that transmit power changes which do not trigger any of the events (i.e., S-RSRP is above threshold or S-RSRP is below a threshold) may occur. This will result in too infrequent S-RSRP reporting which hinders the transmitter (TX) UE from getting an accurate estimation of SL-path loss and hence SL power control.

For CBR measurement reporting, with only two fixed thresholds, the event triggered CBR measurement might not correctly and timely reflect the current CBR level. For example, after CBR exceeds the upper threshold and triggers a CBR measurement report, CBR report will not be triggered if the CBR level keeps increasing.

Certain aspects of the present disclosure and their embodiments may provide solutions to the aforementioned or other challenges. The proposed solutions comprise methods that allow the RX UE to trigger new aperiodic RSRP and/or CBR (RSRP/CBR) reports based on different thresholds. Therefore, the triggering of S-RSRP reports implicitly captures the change in transmit power at the TX UE by frequently triggering S-RSRP reporting and allows TX UE to do more accurate path loss estimation due to frequent S-RSRP reporting. In addition, since UE will trigger a CBR measurement report when CBR crosses any of the configured thresholds, the network can have a more accurate and timely understanding of the current CBR level. According to one aspect, a UE is configured with multiple thresholds (or triggering events) to allow more frequent S-RSRP/CBR reporting. As used hereinafter, the term "configured" means "configured or pre-configured."

Figure 4A:
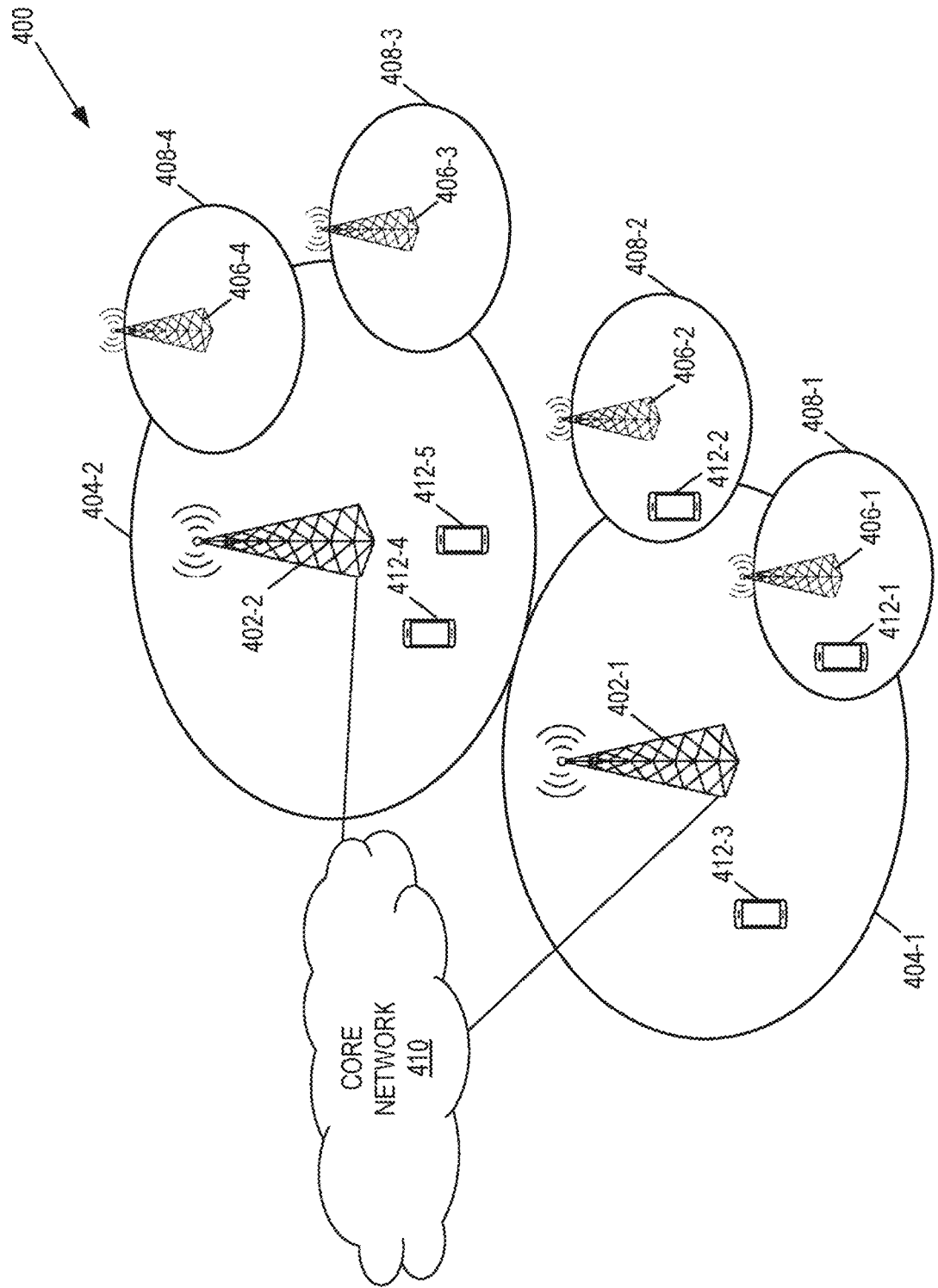
FIGS. 4A and 4B illustrate one example of a cellular communications system in which embodiments of the present disclosure may be implemented.

There are, proposed herein, various embodiments which address one or more of the issues disclosed herein. Certain embodiments may provide at least the following technical advantage. The method enables more accurate path loss/CBR estimation in SL communication, thereby improve sidelink power control performance, resource allocation performance, and hence the overall sidelink communication performance. This includes, for example:

- no additional (frequent) signaling to indicate change in RS transmit power from TX UE to RX UE;
- avoiding or minimizing unnecessary interference to uplink or other sidelink communications, thanks to accurate power control between two UEs involved in SL communication;
- more flexibility to control the S-RSRP reporting based on channel congestion;
- no additional (frequent) signaling to indicate change in CBR level from UE to network;
- the network can timely re-configure the SL UE with a resource pool with low CBR level FIG. 4A illustrates one example of a cellular communications system 400 in which embodiments of the present disclosure may be implemented. In the embodiments described herein, the cellular communications system 400 is a 5G System (5GS) including a Next Generation Radio Access Network (NG-RAN) (also referred to herein as a NR RAN) or an Evolved Packet System (EPS) including a Evolved Universal Terrestrial Radio Access Network (E-UTRAN). In this example, the RAN includes base stations 402-1 and 402-2, which in LTE are referred to as eNBs (when connected to Evolved Packet Core (EPC)) and in 5G NR are referred to as gNBs or next generation eNBs (ng-eNBs) (e.g., LTE RAN nodes connected to 5G Core (5GC)), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5GC and in the EPS is referred to as the EPC. The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. According to some embodiments, one or more of the wireless communication devices 412 may include be included in a vehicle control system (such as a control system of any of the vehicles of FIG. 1) or may be a vehicle-mounted wireless communication device. In the following description, the wireless communication devices 412 are oftentimes UEs and as such sometimes referred to herein as UEs 412, but the present disclosure is not limited thereto.

Figure 2:
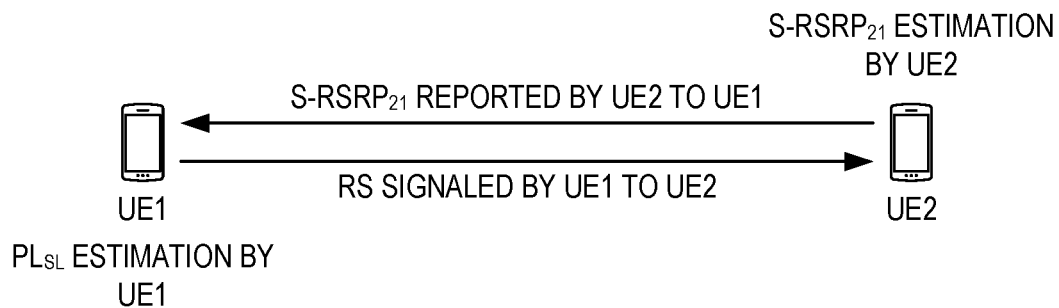
FIG. 2 illustrates the basic principle of sidelink transmit power control for a single unicast transmit (TX)—receive (RX) link, as agreed by Third Generation Partnership Project (3GPP)
Figure 4B:
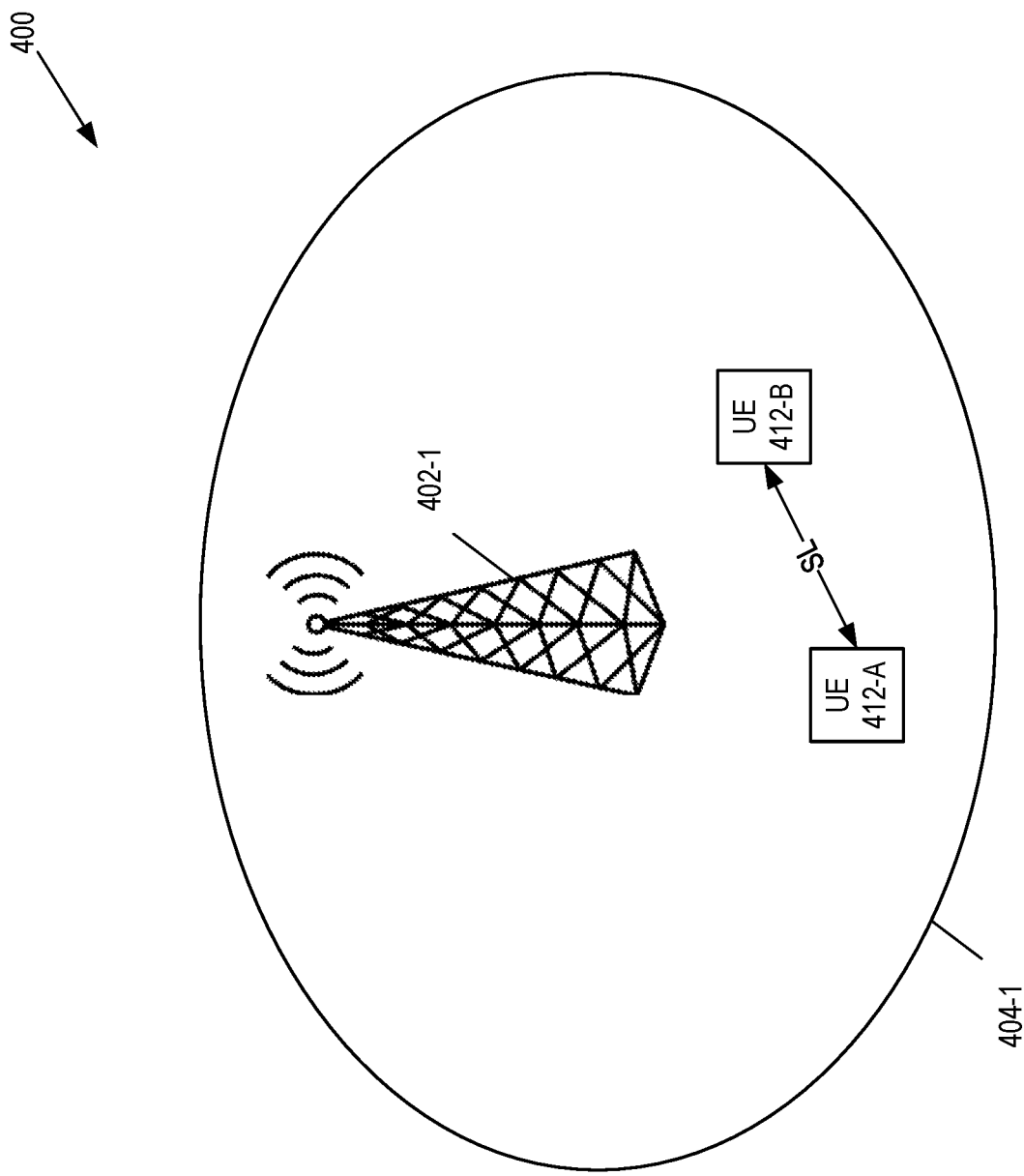

Embodiments relate triggering of aperiodic sideline reporting (e.g., aperiodic S-RSRP reporting or aperiodic CBR reporting). In this regard, FIG. 4B illustrates a sidelink between a first UE 412-A and a second UE 412-B within the cellular communications system 400. In regard to aperiodic S-RSRP reporting, the first UE 412-A is also referred to herein as a TX UE 412-A, and the second UE 412-B is also referred to herein as a RX UE 412-B. For aperiodic S-RSRP reporting, as described herein (see, e.g., FIG. 2), the TX UE 412-A transmits a reference signal(s) (RS(s)) on the sidelink to the RX UE 412-B. The RX UE 412-B measures S-RSRP based on the received RS(s). When a triggering condition occurs, the RX UE 412-B sends a S-RSRP report to the TX UE 412-A. As described below in detail, in contrast to conventional S-RSRP reporting, multiple conditions (e.g., multiple thresholds) are configured to triggering S-RSRP reporting at the RX UE 412-B, in some embodiments. In regard to Channel Busy Ratio (CBR) measurement reporting, when the UE 412-B (or the UE 412-A) is in Radio Resource Control (RRC) CONNECTED state operating SL transmission, the UE 412-B will report Channel Busy Ratio (CBR) measurement to the base station 402-1. For aperiodic CBR measurement reporting, the reporting is event-triggered, and the UE 412-B will report CBR measurement to the base station 402-1 if the measured CBR is above an upper bound threshold or below a lower bound threshold. As described below in detail, in contrast to conventional CBR measurement reporting, multiple conditions (e.g., events) are configured for triggering CBR measurement reporting at the UE 412-B, in some embodiments.

Figure 5:
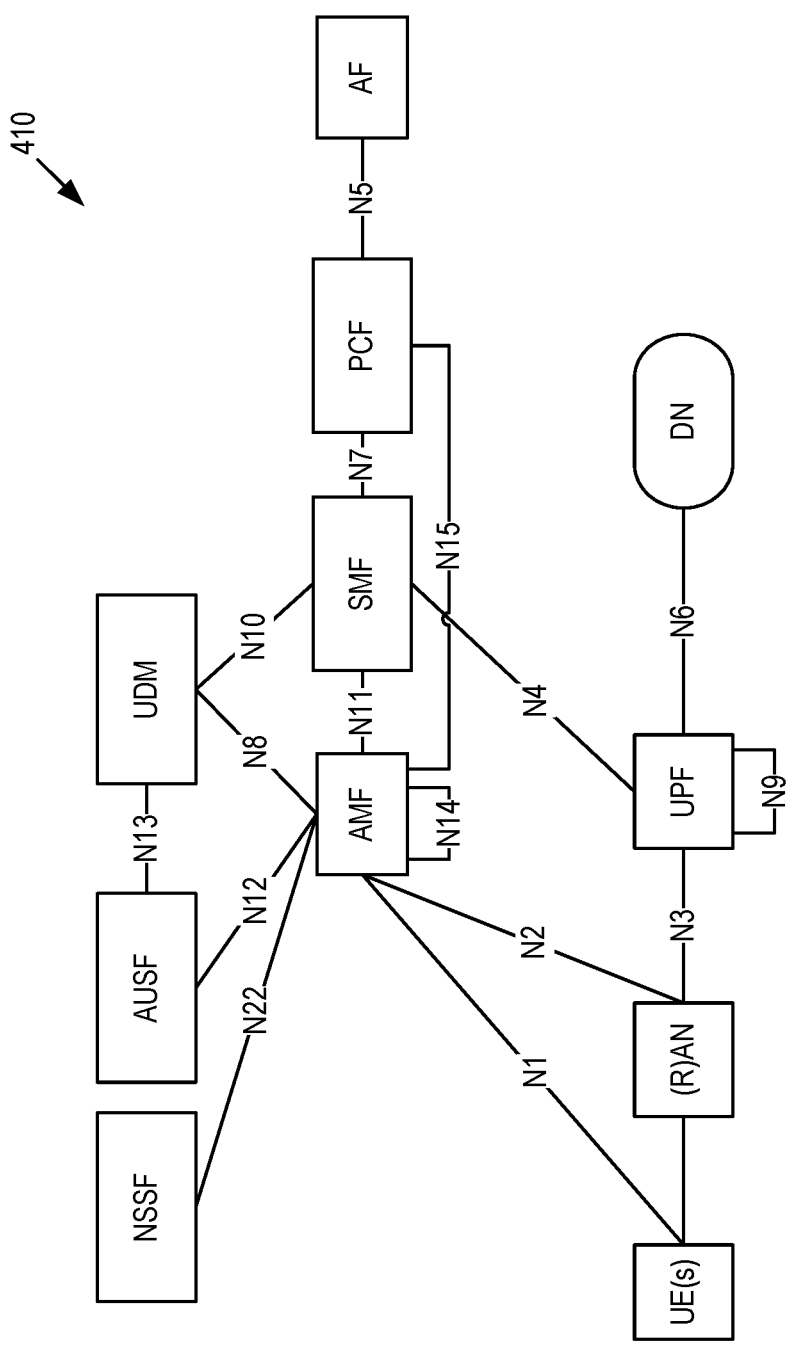
FIGS. 5 and 6 illustrate example embodiments of the cellular communication system of FIGS. 4A and 4B in which the cellular communications system is a Fifth Generation System (5GS)

FIG. 5 illustrates a wireless communication system represented as a 5G network architecture composed of core NFs, where interaction between any two NFs is represented by a point-to-point reference point/interface. FIG. 5 can be viewed as one particular implementation of the system 400 of FIGS. 4A and 4B.

Seen from the access side the 5G network architecture shown in FIG. 5 comprises a plurality of UEs connected to either a RAN or an Access Network (AN) as well as an AMF. Typically, the (R)AN comprises base stations, e.g. such as eNBs or gNBs or similar. Seen from the core network side, the 5G core NFs shown in FIG. 5 include a NSSF, an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5GC network aims at separating user plane and control plane. The user plane carries user traffic while the control plane carries signaling in the network. In FIG. 5, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 5. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 6:
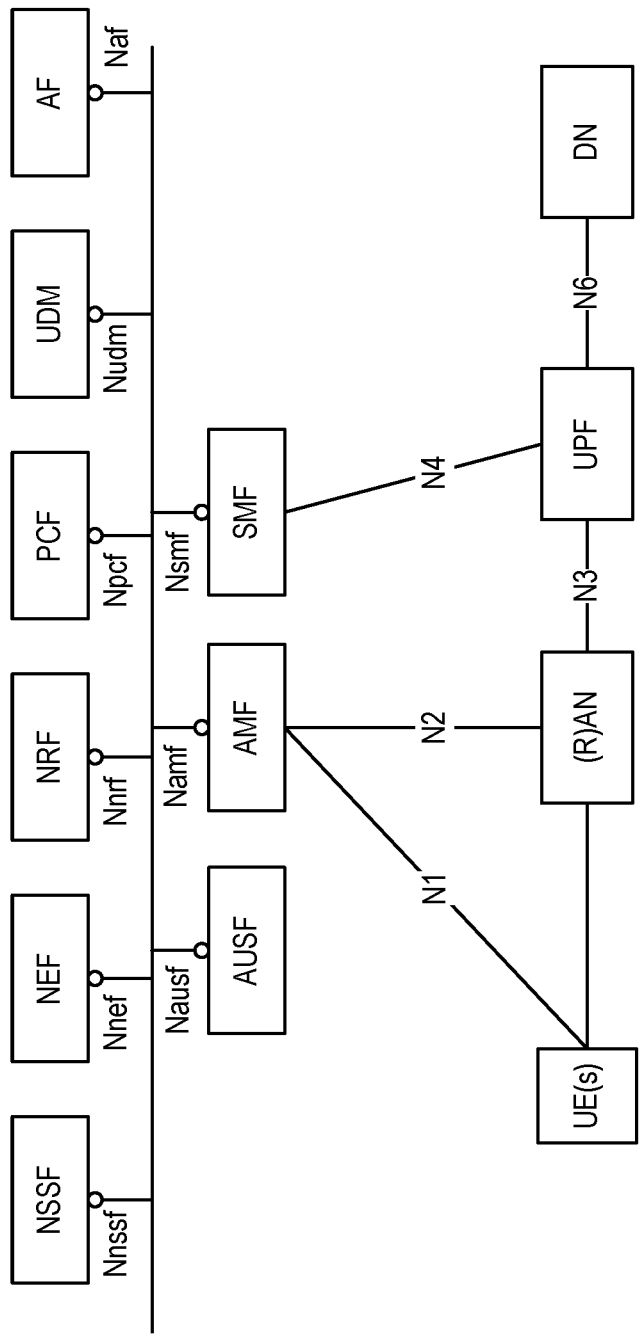

FIG. 6 illustrates a 5G network architecture using service-based interfaces between the NFs in the control plane, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service based interfaces are indicated by the letter "N" followed by the name of the NF, e.g. Namf for the service based interface of the AMF and Nsmf for the service based interface of the SMF etc. The NEF and the NRF in FIG. 6 are not shown in FIG. 5 discussed above. However, it should be clarified that all NFs depicted in FIG. 5 can interact with the NEF and the NRF of FIG. 6 as necessary, though not explicitly indicated in FIG. 5.

Some properties of the NFs shown in FIGS. 5 and 6 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

The subject matter disclosed here is suitable for any Radio Access Technology (RAT) (e.g., LTE, NR etc.) with a D2D mode. The term gNB used herein may refer to or correspond to any type of radio network node, e.g., base station, access node, Integrated Access and Backhaul (IAB) node, eNB, etc. The term RSRP or S-RSRP used herein may refer to or correspond to any type of signal strength measurement, e.g., received signal level of a reference signal at UE from another radio node (e.g., another UE, radio network node, e.g., base station etc.).

Figure 7:
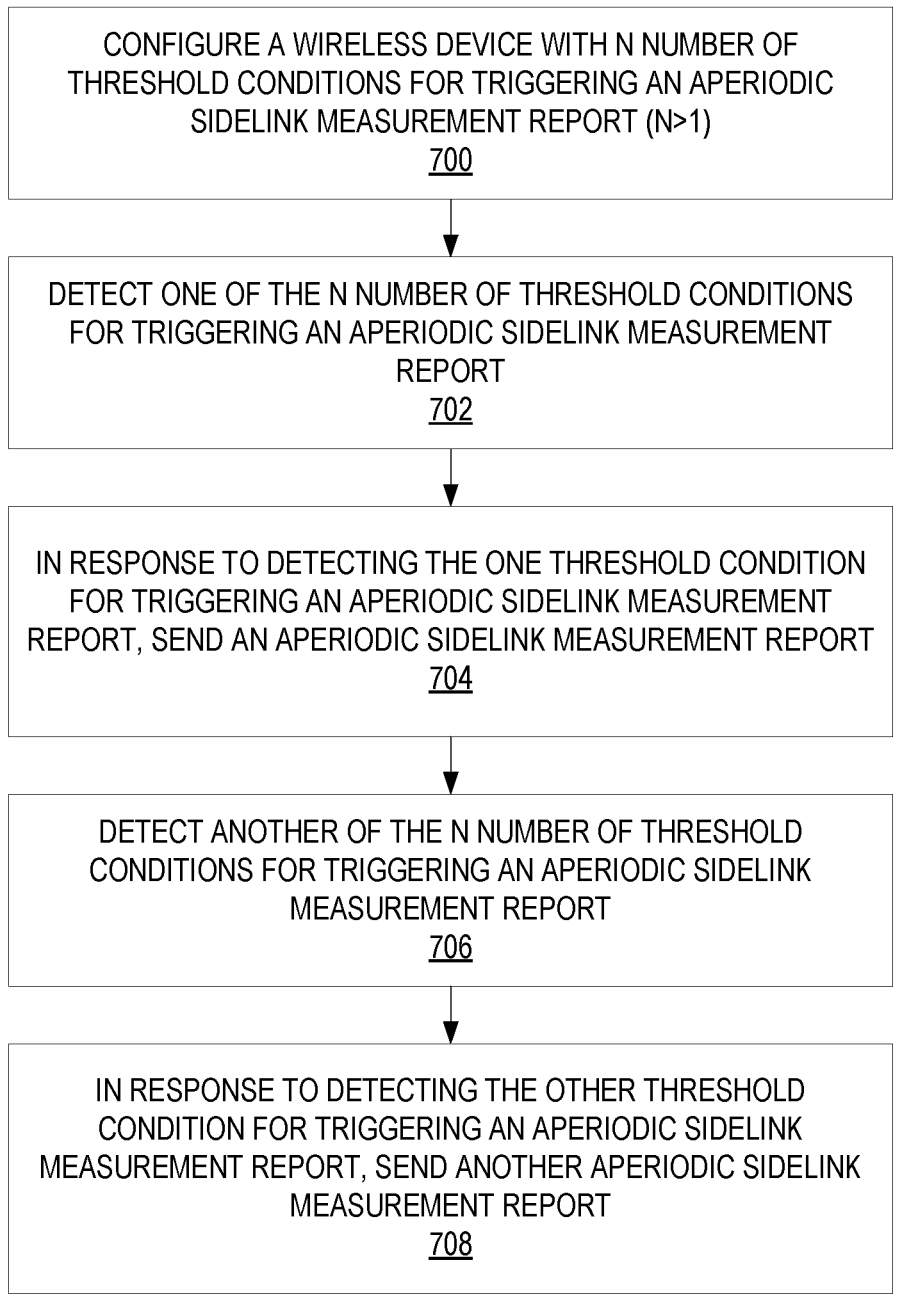
FIG. 7 illustrates an exemplary method performed by a wireless device for reporting sidelink measurements according to one aspect of the present disclosure.

FIG. 7 illustrates an exemplary method, performed by a wireless device (e.g., RX UE 412-B), for reporting sidelink measurements according to one aspect of the present disclosure. In the embodiment illustrated in FIG. 7, the method comprises the following steps:

Step 700. Configure the wireless device with N number of threshold conditions for triggering an aperiodic sidelink measurement report, where N>1. In other words, the wireless device is configured (e.g., by a network node such as, e.g., a gNB or base station 402) with N threshold conditions for triggering an aperiodic sidelink measurement report, where N>1. Thus, the wireless device obtains the N threshold conditions for triggering an aperiodic sidelink measurement report. As described herein, the aperiodic sidelink measurement report is a S-RSRP report or a CBR report.

Step 702. The wireless device detects one of the N number of threshold conditions for triggering an aperiodic sidelink measurement report.

Step 704. In response to detecting the one threshold condition for triggering an aperiodic sidelink measurement report, the wireless device sends an aperiodic sidelink measurement report. As described in the Background section above, if the aperiodic sidelink measurement report is a S-RSRP report, the report is sent to the TX UE (e.g., TX UE 412-A). Conversely, if the aperiodic measurement report is a CBR measurement report, the report is sent to the network (e.g., to the base station 402).

Step 706. The wireless device detects another of the N number of threshold conditions for triggering an aperiodic sidelink measurement report.

Step 708. In response to detecting the other threshold condition for triggering an aperiodic sidelink measurement report, the wireless device sends another aperiodic sidelink measurement report.

For the following, the wireless device of FIG. 7 is a UE (e.g., the UE 412-B). According to the one aspect, the UE (e.g., UE 412-B) is configured with multiple thresholds (e.g., N thresholds) which are used to trigger an aperiodic S-RSRP/CBR reporting. In one embodiment, two thresholds (i.e., N=2), threshold 1 and threshold 2, are configured for RSRP reporting. In this case, the UE is the RX UE. If an RSRP is above threshold 1, the RX UE triggers the S-RSRP reporting. Similarly, if the measured S-RSRP gets higher that threshold 2, the RX UE again triggers the S-RSRP reporting. Retriggering of S-RSRP reporting allows the RX UE to take into account the change in transmission power so that the TX UE is able to do more accurate SL-path loss estimation. In another embodiment, two thresholds (i.e., N=2), threshold 1 and threshold 2 are configured for CBR report. If the measured CBR is above threshold 1, the UE triggers a CBR report to the network (e.g., to a base station 402). Similarly, if the measured CBR gets higher that threshold 2, the UE again triggers the CBR reporting.

Now, a number of RSRS report related embodiments will be described. According to an embodiment, a value N for RSRP report is dependent on the channel congestion (of the sidelink) measured using CBR. For instance, if CBR is above a certain threshold, the RX UE is configured to trigger S-RSRP reporting using a lower number of thresholds (i.e., smaller N). In other words, this means that S-RSRP reporting will be triggered less frequently by the RX UE in case of high congestion in the channel. In another example, the RX UE is configured to trigger S-RSRP reporting using a higher number of thresholds (i.e., larger N). In other words, this means that S-RSRP reporting will be triggered more frequently by the RX UE in case of low congestion in the channel.

According to an embodiment, only one threshold can be configured. For instance, the RX UE triggers S-RSRP reporting only when the measured S-RSRP falls below a certain threshold.

According to another embodiment, a value of N is configured based on the estimate on the change of TX power of the RS on which S-RSRP is measured on. For instance, if the TX UE is configured to use only SL-path loss estimation for SL path loss as in Equation (2) above, a lower number of thresholds (N) may be configured for S-RSRP triggering.

According to another embodiment, the multiple thresholds are defined in terms of events which cause the RX UE to trigger S-RSRP reporting. In this case, the RX UE is configured to use one (or a few or all) of these events to do S-RSRP report triggering. For instance, two events are defined, i.e., event A and event B. The RX UE enters an event A if measured S-RSRP (minus Hysteresis factor) is above a threshold 1 and leaves the event if measured S-RSRP (plus Hysteresis factor) is below a threshold 1. Similarly, the RX UE enters an event B if measured S-RSRP (minus Hysteresis factor) is above a threshold 2 and leaves the event if measured S-RSRP (plus Hysteresis factor) is below a threshold 2.

According to another embodiment, the thresholds are defined to trigger the S-RSRP reporting based on the differences in the measured S-RSRP at different time instances. For instance, if the difference of two consecutive measurements of S-RSRP reporting becomes higher than the threshold, then the RX UE triggers an S-RSRP report.

According to another embodiment, the thresholds are defined to trigger the S-RSRP reporting based on the difference in the measured filtered S-RSRP and the measured instantaneous S-RSRP. For instance, if the difference of instantaneous S-RSRP reporting to the filtered S-RSRP reporting is high, then the RX UE applies a filter over new measuring period and triggers a new S-RSRP report.

According to another embodiment, a new event is defined to trigger S-RSRP based on the change of some TX parameters. For instance, if the bandwidth or number of layers of RS transmission on which RS measurements are done is changed, then the RX UE triggers a new RSRP report.

According to another embodiment, the RX UE is configured by the network via Radio Resource Control (RRC)/System Information Block (SIB) signaling or preconfigured with any combination of the following:

A list of S-RSRP thresholds;

A mapping between lists of S-RSRP thresholds and CBR levels, e.g., for each CBR there is a corresponding list of S-RSRP thresholds; and A list of S-RSRP thresholds and a mapping between lists of S-RSRP threshold indexes and CBR levels, e.g., list of S-RSRP thresholds is configured separately, then each CBR is associated with a list of indexes and each index points to a S-RSRP threshold value.

Now a number of CBR report related embodiments will be described. According to an embodiment, a UE is configured with a list of CBR thresholds, and the UE reports CBR measurement when the measured CBR crosses any CBR threshold in the list. The list of CBR thresholds can be configured by the network via RRC/SIB signaling.

According to another embodiment, a UE reports CBR measurement if the difference between two times CBR measurements is larger than a threshold (e.g., $CBRT_T$-$CBRT_{T-1}$>threshold). Such threshold can be configured by network via RRC/SIB signaling.

Figure 8:
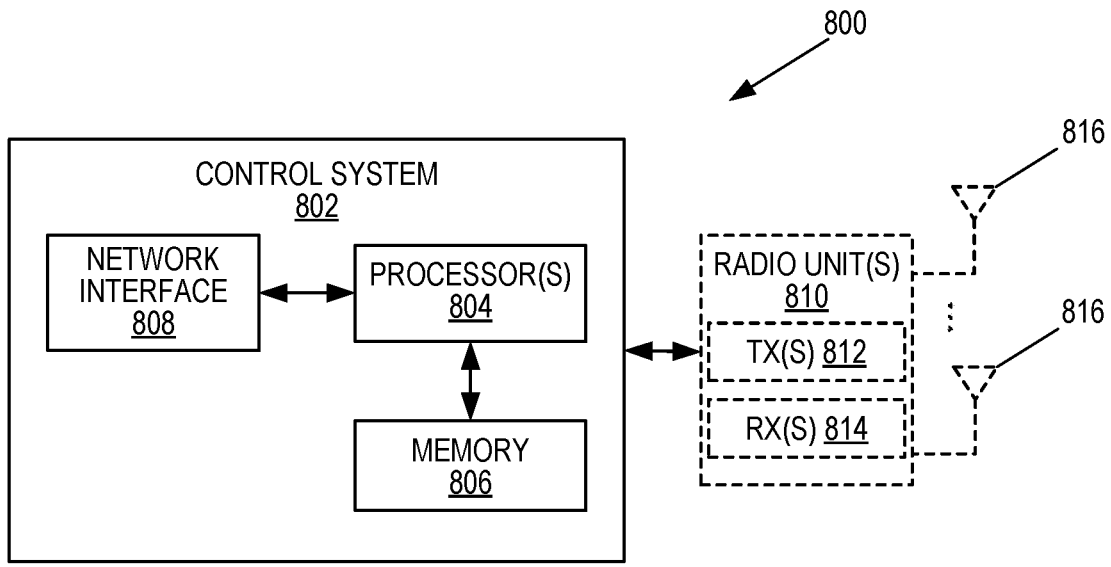
FIGS. 8, 9, and 10 are schematic block diagrams of example embodiments of a radio access node.

FIG. 8 is a schematic block diagram of a radio access node 800 according to some embodiments of the present disclosure. Optional features are represented by dashed boxes. The radio access node 800 may be, for example, a base station 402 or 406 or a network node that implements all or part of the functionality of the base station 402 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
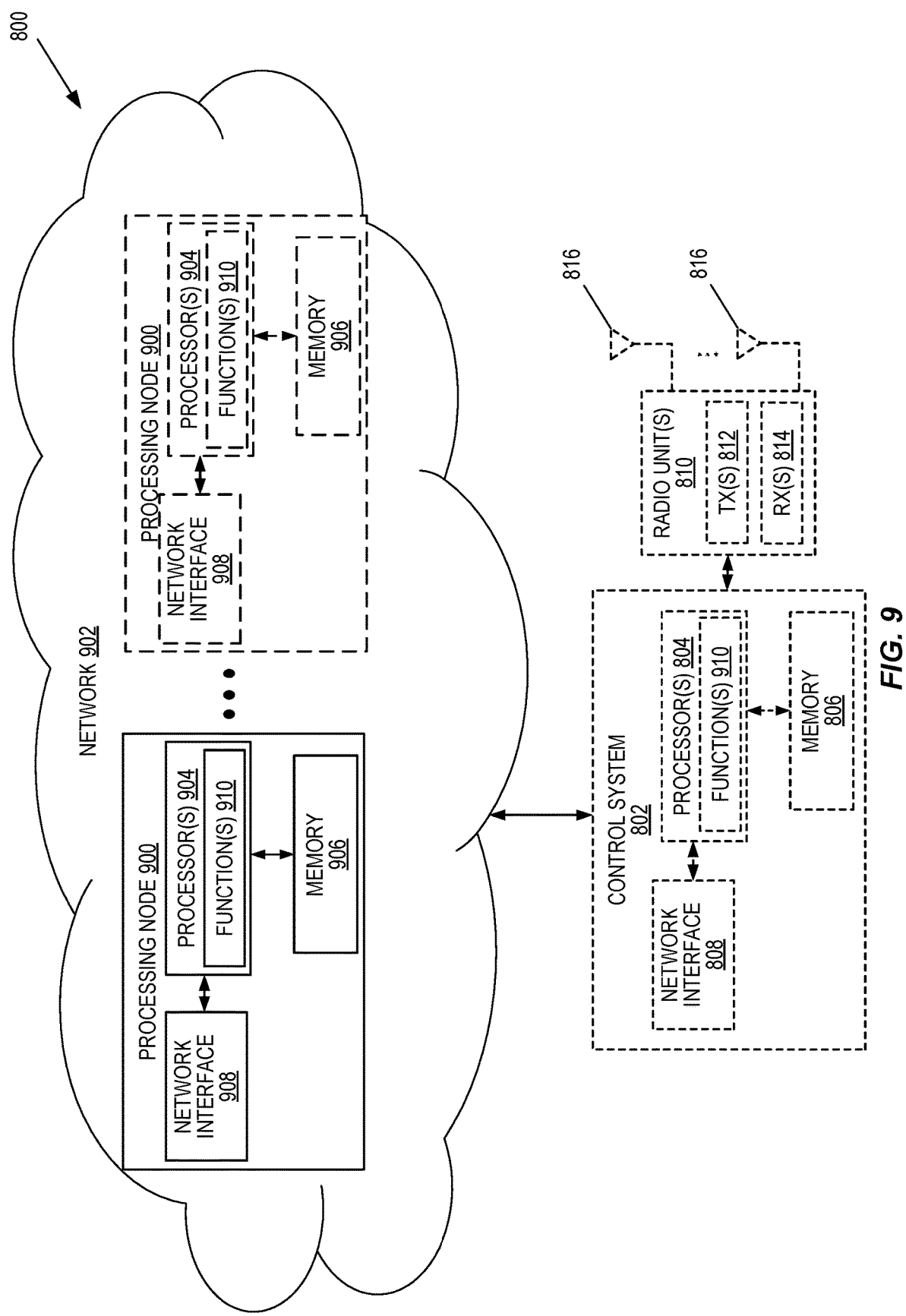

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
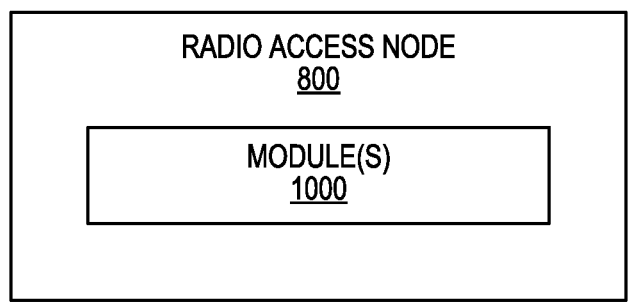

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
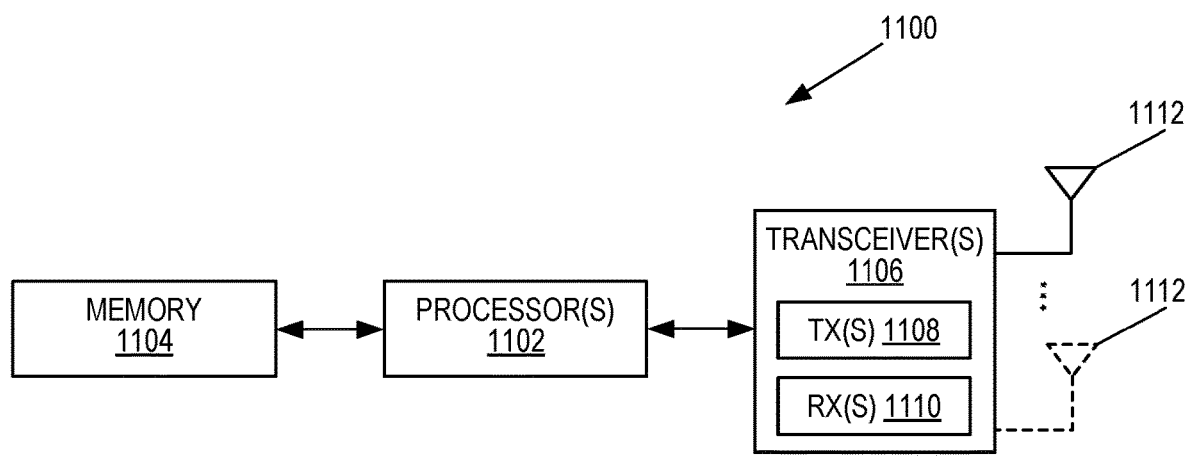
FIGS. 11 and 12 are schematic block diagrams of example embodiments of a wireless device.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
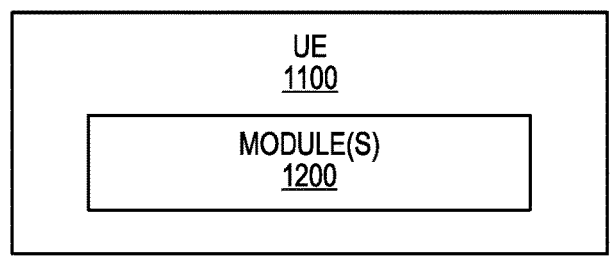

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Group A Embodiments

Embodiment 1: A method performed by a wireless device for reporting sidelink measurements, the method comprising: configuring the wireless device with N number of threshold conditions for triggering an aperiodic sidelink measurement report, where N>1; detecting one of the N number of threshold conditions for triggering an aperiodic sidelink measurement report; and in response to detecting the one threshold condition for triggering an aperiodic sidelink measurement report, sending an aperiodic sidelink measurement report to a base station.

Embodiment 2: The method of embodiment 1, further comprising: detecting another of the N number of threshold conditions for triggering an aperiodic sidelink measurement report; and, in response to detecting the other threshold condition for triggering an aperiodic sidelink measurement report, sending an aperiodic sidelink measurement report to a base station.

Embodiment 3: The method of embodiment 1 or 2 wherein at least one of the N number of threshold conditions for triggering an aperiodic sidelink measurement report comprises a hysteresis factor.

Embodiment 4: The method of embodiments 1 or 2 wherein detecting one of the N number of threshold conditions for triggering an aperiodic sidelink measurement report comprises detecting that a monitored characteristic has reached a threshold value.

Embodiment 5: The method of embodiments 1 or 2 wherein detecting one of the N number of threshold conditions for triggering an aperiodic sidelink measurement report comprises detecting that a monitored characteristic has changed by a threshold value.

Embodiment 6: The method of embodiments 1-5 wherein the aperiodic sideline measurement report comprises a Reference Signal Received Power, RSRP, measurement.

Embodiment 7: The method of embodiment 6 wherein the RSRP measurement comprises at least one of: a RSRP measurement of a Sidelink Reference Signal, S-RSRP; a RSRP measurement of a Cell-specific Reference Signal, CRS-RSRP; a RSRP measurement of a Secondary Synchronization Signal, SS-RSRP; or a RSRP measurement of a Channel State Information signal, CSI-RSRP.

Embodiment 8: The method of embodiment 6 or 7 wherein detecting one of the N number of threshold conditions for triggering an aperiodic sidelink measurement report comprises detecting that the measured RSRP crosses a first RSRP threshold condition.

Embodiment 9: The method of embodiment 8 wherein detecting that the measured RSRP crosses a first RSRP threshold condition comprises detecting that the measured S-RSRP falls below a predefined threshold.

Embodiment 10: The method of embodiments 6-9 wherein detecting another of the N number of threshold conditions comprises detecting that the measured RSRP crosses a second RSRP threshold condition.

Embodiment 11: The method of embodiments 6 or 7 wherein detecting one of the N number of threshold conditions for triggering an aperiodic sidelink measurement report comprises detecting that an instantaneous RSRP measurement differs from a filtered or averaged RSRP measurement by a threshold amount.

Embodiment 12: The method of embodiments 1-11 wherein configuring the wireless device with N number of threshold conditions for triggering an aperiodic sidelink measurement report comprises configuring the wireless device with at least one of: a list of S-RSRP thresholds; a mapping between lists of S-RSRP thresholds and CBR levels; and a list of S-RSRP thresholds, and a mapping between lists of S-RSRP threshold indexes and CBR levels.

Embodiment 13: The method of embodiments 1-5 wherein the aperiodic sideline measurement report comprises a Channel Busy Ratio, CBR, measurement.

Embodiment 14: The method of embodiments 13 wherein detecting one of the N number of threshold conditions for triggering an aperiodic sidelink measurement report comprises detecting that the measured CBR crosses a first CBR threshold condition.

Embodiment 15: The method of embodiments 13-14 wherein detecting one of the N number of threshold conditions for triggering an aperiodic sidelink measurement report comprises detecting that the measured CBR has reached a threshold value.

Embodiment 16: The method of embodiments 13-14 wherein detecting one of the N number of threshold conditions for triggering an aperiodic sidelink measurement report comprises detecting that the measured CBR has changed by a threshold value.

Embodiment 17: The method of embodiments 13-16 wherein detecting another of the N number of threshold conditions comprises detecting that the measured CBR crosses a second CBR threshold condition.

Embodiment 18: The method of any of the prior embodiments wherein the number N of threshold conditions is dynamically adjusted based on channel conditions.

Embodiment 19: The method of embodiments 1-18 wherein the number N of threshold conditions is dynamically adjusted based on channel congestion measured as CBR.

Embodiment 20: The method of embodiment 19 wherein the number N of threshold conditions is reduced if CBR is above a first congestion threshold or increased if CBR is below the first congestion threshold or a second congestion threshold.

Embodiment 21: The method of any of the previous embodiments, further comprising: providing user data; and forwarding the user data to a host computer via the transmission to the base station.

Group B Embodiments

Embodiment 22: A wireless device for reporting sidelink measurements, the wireless device comprising: processing circuitry configured to perform any of the steps of any of the Group A embodiments; and power supply circuitry configured to supply power to the wireless device.

Embodiment 23: A User Equipment, UE, for reporting sidelink measurements, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 24: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 25: The communication system of the previous embodiment, wherein the cellular network further includes a base station configured to communicate with the UE.

Embodiment 26: The communication system of the previous 2 embodiments, wherein: the processing circuitry of the host computer is configured to execute a host application, thereby providing the user data; and the UE's processing circuitry is configured to execute a client application associated with the host application.

Embodiment 27: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 28: The method of the previous embodiment, further comprising at the UE, receiving the user data from the base station.

Embodiment 29: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 30: The communication system of the previous embodiment, further including the UE.

Embodiment 31: The communication system of the previous 2 embodiments, further including the base station, wherein the base station comprises a radio interface configured to communicate with the UE and a communication interface configured to forward to the host computer the user data carried by a transmission from the UE to the base station.

Embodiment 32: The communication system of the previous 3 embodiments, wherein: the processing circuitry of the host computer is configured to execute a host application; and the UE's processing circuitry is configured to execute a client application associated with the host application, thereby providing the user data.

Embodiment 33: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 34: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 35: The method of the previous embodiment, further comprising, at the UE, providing the user data to the base station.

Embodiment 36: The method of the previous 2 embodiments, further comprising: at the UE, executing a client application, thereby providing the user data to be transmitted; and at the host computer, executing a host application associated with the client application.

Embodiment 37: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 38: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 39: The method of the previous embodiment, further comprising at the base station, receiving the user data from the UE.

Embodiment 40: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless device for reporting sidelink measurements, the method comprising:
   obtaining a configuration of a plurality of threshold conditions for triggering an aperiodic sidelink measurement report;
   detecting one of the plurality of threshold conditions for triggering an aperiodic sidelink measurement report; and
   in response to detecting the one of the plurality of threshold conditions for triggering an aperiodic sidelink measurement report, sending an aperiodic sidelink measurement report, wherein a number of threshold conditions in the plurality of threshold conditions is dynamically adjusted based on channel conditions.

2. The method of claim 1, further comprising:
   detecting another of the plurality of threshold conditions for triggering an aperiodic sidelink measurement report; and
   in response to detecting the another of the plurality of threshold conditions for triggering an aperiodic sidelink measurement report, sending another aperiodic sidelink measurement report.

3. The method of claim 1, wherein the plurality of threshold conditions are for triggering an aperiodic Sidelink Reference Signal Receive Power (S-RSRP) report for a sidelink between the wireless device and another wireless device.

4. The method of claim 3, wherein the plurality of threshold conditions for triggering an aperiodic S-RSRP report comprises a number of threshold conditions, and the number of threshold conditions is dependent on:
   channel congestion;
   a measured channel congestion for the sidelink;
   a measured Channel Busy Ratio (CBR) for the sidelink; or
   a change of transmit power of a reference signal on which the wireless device measures S-RSRP for the sidelink.

5. The method of claim 3, wherein the plurality of threshold conditions for triggering an aperiodic S-RSRP report comprises threshold conditions defined in terms of events which cause the wireless device to trigger S-RSRP reporting.

6. The method of claim 3, wherein the plurality of threshold conditions for triggering an aperiodic S-RSRP report comprises threshold conditions defined to trigger S-RSRP reporting based on differences between S-RSRP measurements performed by the wireless device at different time instances.

7. The method of claim 3, wherein the one of the plurality of threshold conditions for triggering an aperiodic sidelink measurement report is a threshold condition to trigger S-RSRP reporting when a difference between two consecutive S-RSRP measurements performed on the wireless device for the sidelink is higher than a threshold.

8. The method of claim 3, wherein the plurality of threshold conditions for triggering an aperiodic S-RSRP report comprises threshold conditions defined to trigger S-RSRP reporting based on difference between a filtered S-RSRP measurement on the sidelink and an instantaneous S-RSRP measurement on the sidelink.

9. The method of claim 3, wherein the plurality of threshold conditions for triggering an aperiodic S-RSRP report comprises an event defined to trigger S-RSRP reporting based on a change of one or more transmit parameters used by the other wireless device for the sidelink.

10. The method of claim 1, wherein the plurality of threshold conditions are for triggering an aperiodic Channel Busy Ratio (CBR) measurement report for a sidelink between the wireless device and another wireless device.

11. The method of claim 10, wherein the plurality of threshold conditions comprises a plurality of CBR thresholds for triggering an aperiodic CBR measurement report.

12. The method of claim 10, wherein the plurality of threshold conditions comprises threshold conditions defined to trigger an aperiodic CBR measurement report when a difference between CBR measurements at different time instances is greater than a threshold.

13. The method of claim 1, wherein at least one of the plurality of threshold conditions for triggering an aperiodic sidelink measurement report comprises a hysteresis factor.

14. The method of claim 13, wherein the aperiodic sidelink measurement report comprises a Sidelink Reference Signal Received Power (S-RSRP) measurement.

15. The method of claim 1, wherein detecting the one of the plurality of threshold conditions for triggering an aperiodic sidelink measurement report comprises detecting that a monitored characteristic has reached a respective threshold value or a respective threshold amount.

16. The method of claim 1, wherein the number of threshold conditions in the plurality of threshold conditions is dynamically adjusted based on channel congestion measured as CBR.

17. A wireless device for reporting sidelink measurements, the wireless device comprising:
   one or more transmitters;
   one or more receivers; and
   processing circuitry associated with the one or more transmitters and the one or more receivers, the processing circuitry configured to cause the wireless device to:
      obtain a configuration of a plurality of threshold conditions for triggering an aperiodic sidelink measurement report;
      detect one of the plurality of threshold conditions for triggering an aperiodic sidelink measurement report; and
      in response to detecting the one of the plurality of threshold conditions for triggering an aperiodic sidelink measurement report, send an aperiodic sidelink measurement report, wherein a number of threshold conditions in the plurality of threshold conditions is dynamically adjusted based on channel conditions.

18. The wireless device of claim 17, wherein the processing circuitry is included in a vehicle control system.

19. A vehicle comprising:
   one or more transmitters;
   one or more receivers; and
   processing circuitry associated with the one or more transmitters and the one or more receivers, the processing circuitry configured to cause the vehicle to perform operations comprising:
      obtaining a configuration of a plurality of threshold conditions for triggering an aperiodic sidelink measurement report;
      detecting one of the plurality of threshold conditions for triggering an aperiodic sidelink measurement report; and
      in response to detecting the one of the plurality of threshold conditions for triggering an aperiodic sidelink measurement report, sending an aperiodic sidelink measurement report, wherein a number of threshold conditions in the plurality of threshold conditions is dynamically adjusted based on channel conditions.

* * * * *